(12) United States Patent
Chiang

(10) Patent No.: US 6,293,321 B1
(45) Date of Patent: Sep. 25, 2001

(54) WOOD PLANING MACHINE WITH A SAWDUST-COLLECTING MECHANISM

(76) Inventor: Pei-Lieh Chiang, No. 12, Nan-Ping Rd., Nan Dist, Taichung City (TW)

( * ) Notice: Subject to any disclaimer, the term of this patent is extended or adjusted under 35 U.S.C. 154(b) by 0 days.

(21) Appl. No.: 09/781,347

(22) Filed: Feb. 12, 2001

(51) Int. Cl.[7] .......................... B27G 21/00; B27G 19/00; B23Q 11/00; B23C 1/00

(52) U.S. Cl. .................. 144/252.1; 15/312.2; 15/314; 55/314; 83/100; 144/114.1; 144/286.5; 144/117.1; 409/137; 451/456

(58) Field of Search ................................ 15/300.1, 312.1, 15/312.2, 415.1; 55/314, 419; 83/100; 144/114.1, 117.1, 252.1, 252.2, 286.1, 286.5; 409/134, 137; 451/456

(56) References Cited

U.S. PATENT DOCUMENTS

| | | |
|---|---|---|
| 3,167,260 * | 1/1965 | Gibbons et al. ............... 144/252.1 X |
| 4,088,164 * | 5/1978 | McCord, Jr. ...................... 409/137 X |
| 4,485,859 * | 12/1984 | Krogstad et al. ................. 144/252.1 |
| 5,525,396 * | 6/1996 | Rudolph et al. .................... 55/342 X |
| 5,592,227 * | 1/1997 | Varley ........................... 144/117.1 X |

* cited by examiner

Primary Examiner—W Donald Bray
(74) Attorney, Agent, or Firm—Ladas & Parry

(57) ABSTRACT

A wood planing machine includes a base, a cutter carriage, a motor housing mounted on the cutter carriage and having a vent port, a motor disposed in the motor housing, a rotary cutter mounted on the cutter carriage, a shaft extending from the rotary cutter and driven by the motor, a blower mounted on the cutter carriage and having a fan driven by the shaft, a sawdust-guiding member mounted on the cutter carriage and having a box and a rear spout extending from the box to the rotary cutter to define a sawdust passageway, an air duct in fluid communication with the vent port of the motor housing and the box, a first conduit in fluid communication with the blower housing and the box, a second conduit in fluid communication with the blower housing, and a sawdust collector in fluid communication with the second conduit.

1 Claim, 5 Drawing Sheets

WOOD PLANING MACHINE WITH A SAWDUST-COLLECTING MECHANISM

BACKGROUND OF THE INVENTION

1. Field of the Invention

This invention relates to a wood planing machine, more particularly to a wood planing machine with a sawdust-collecting mechanism.

2. Description of the Related Art

A sawdust-collecting apparatus is normally provided for a wood planing machine for conducting a sawdust-removing operation during planing, and includes a suction device with a conduit extending therefrom to the wood planing machine so as to remove the sawdust. However, it is relative expensive to install a separate sawdust-collecting apparatus.

SUMMARY OF THE INVENTION

Therefore, it is an object of the present invention to provide a wood planing machine that is capable of providing both planing and sawdust-removing functions during processing of a wooden workpiece.

Accordingly, a wood planing machine of this invention comprises: a base having two opposite sides and front and rear sides; two pairs of supporting rods respectively extending upright from the opposite sides of the base; a cutter carriage including a pair of parallel carriage casings extending between and mounted movably and respectively on the pairs of the supporting rods; a motor housing mounted on the cutter carriage between the carriage casings at the rear side of the base, and having a vent port that opens frontwardly; a motor disposed in the motor housing; a rotary cutter mounted on and extending in a transverse direction between the carriage casings below the motor housing, and adapted to plane a wooden workpiece thereunder; a rotatable shaft extending from the rotary cutter in the transverse direction through one of the carriage casings and driven by the motor; a blower mounted on said one of the carriage casings opposite to the shaft, and having a blower housing with an inlet port and an outlet port, and a fan disposed in the blower housing and connected to the shaft; a sawdust-guiding member that includes a box mounted on the cutter carriage at the front side of the base and extending in the transverse direction between the carriage casings to define therein a flow channel with an entrance port and an exit port opposite to the entrance port, and a rear spout extending rearwardly in a direction transverse to the flow channel to the rotary cutter to define a sawdust passageway therein, the spout having an arcuate open end that circumferentially surrounds a top portion of the rotary cutter to define therebetween a sawdust entrance space that is in fluid communication with the sawdust passageway; an air duct interconnecting and in fluid communication with the vent port of the motor housing and the entrance port of the box; a first conduit interconnecting and in fluid communication with the inlet port of the blower housing and the exit port of the box; a second conduit connected to and in fluid communication with the outlet port of the blower housing; and a sawdust collector connected to and in fluid communication with the second conduit. Whereby, rotation of the motor results in air flow from the vent port into the flow channel via the air duct, and simultaneously causes rotation of the fan via the shaft, which in turn, results in induction of air flow from the flow channel to the sawdust collector via the first and second conduits.

BRIEF DESCRIPTION OF THE DRAWINGS

In drawings which illustrate an embodiment of the invention.

DETAILED DESCRIPTION OF THE PREFERRED EMBODIMENT

Figure 1:
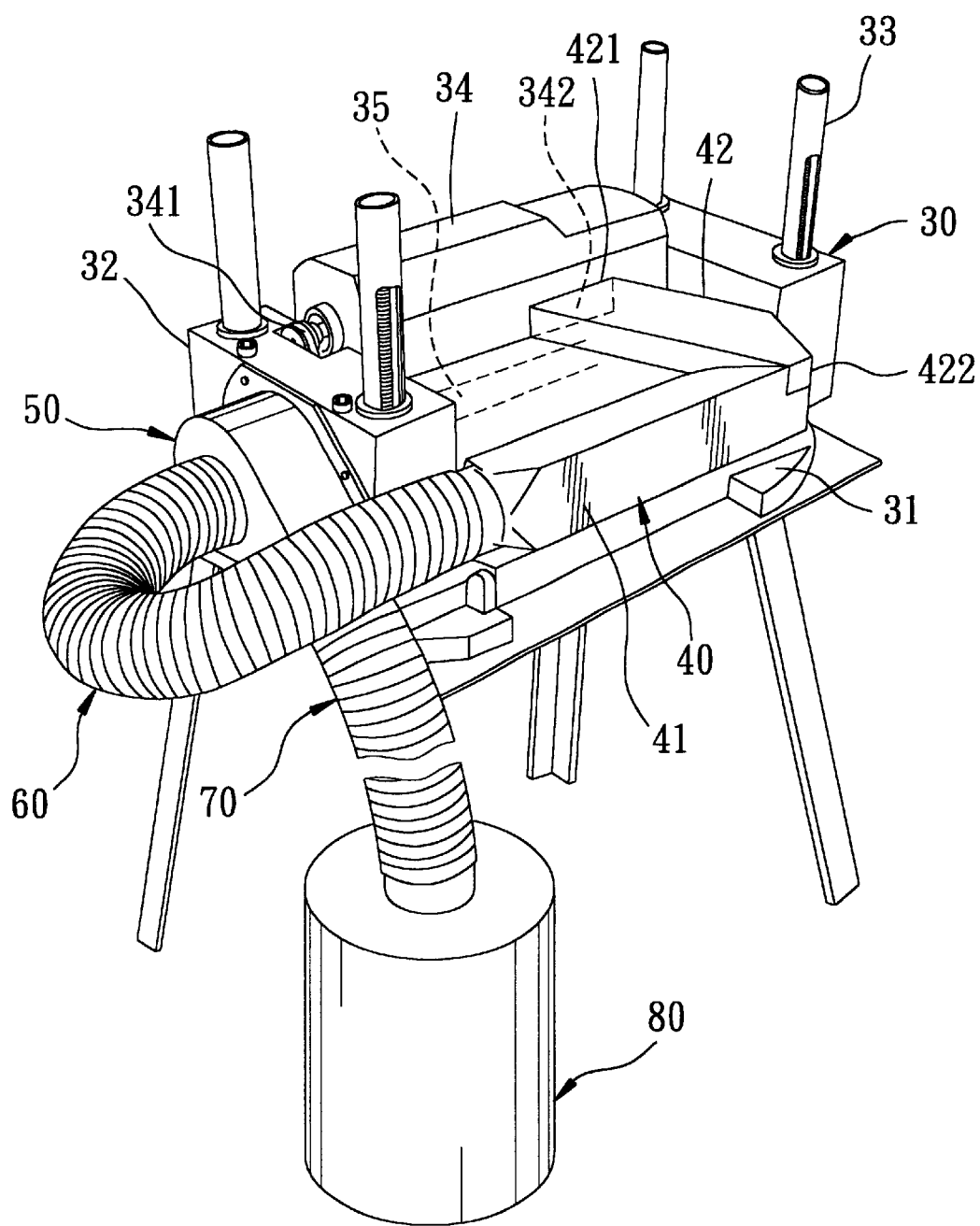
FIG. 1 is a perspective view of a wood planing machine embodying this invention.
Figure 2:
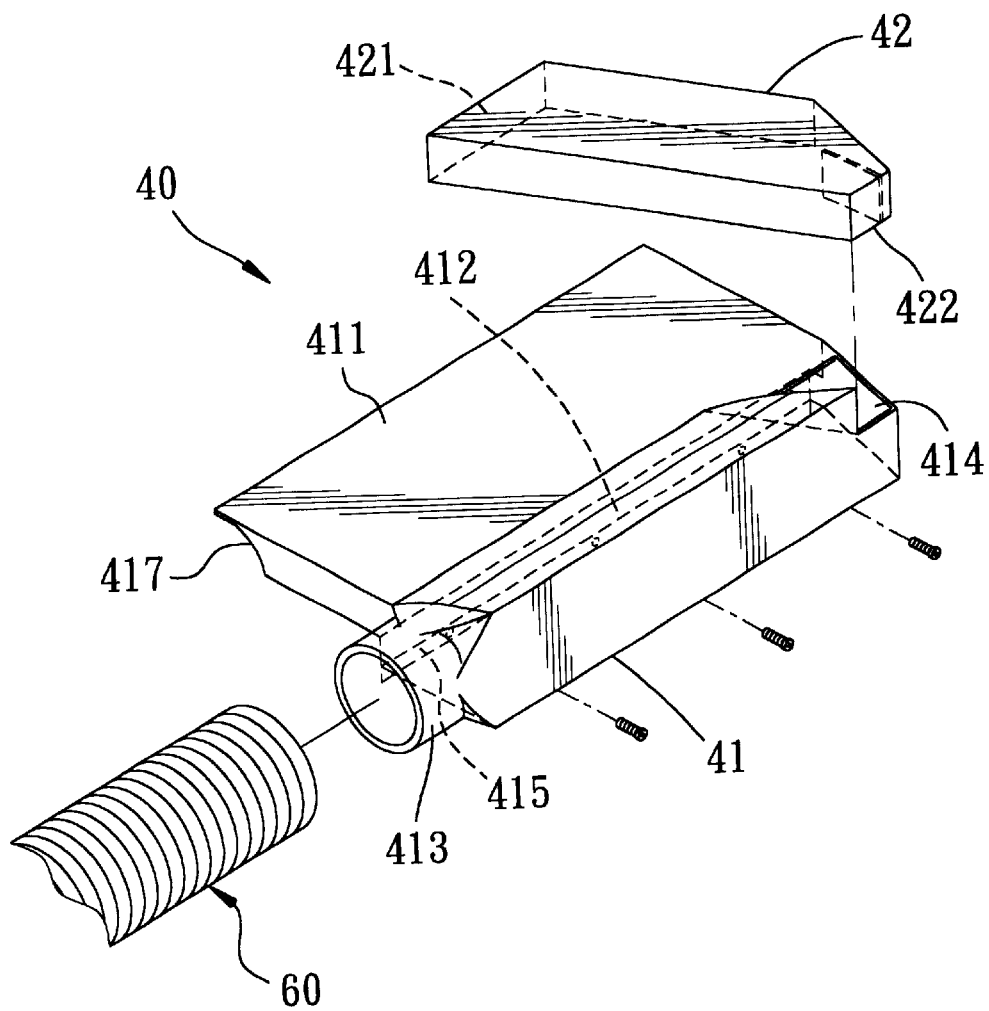
FIG. 2 is a fragmentary exploded view showing a sawdust-guiding box of the wood planing machine of FIG. 1.
Figure 3:
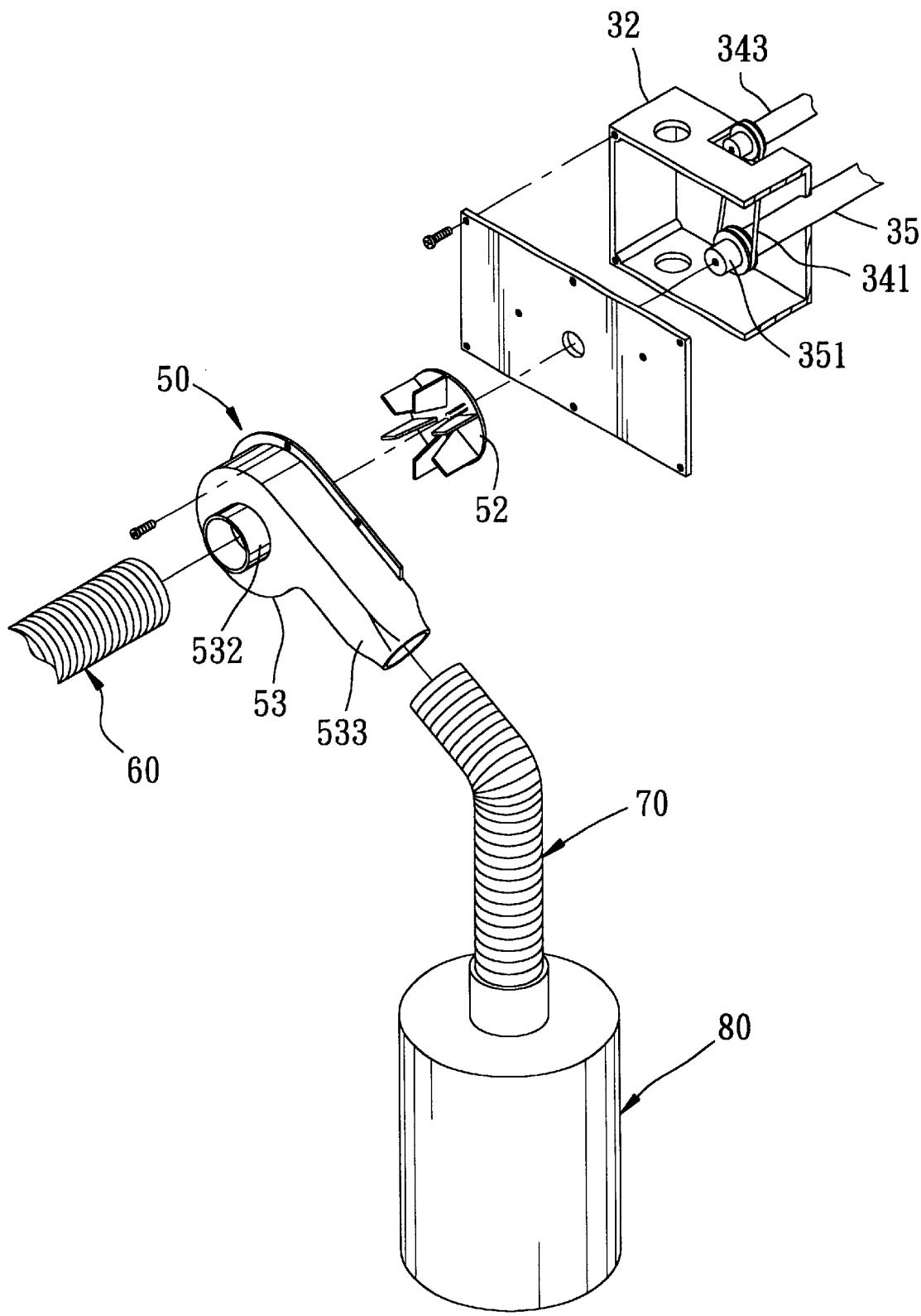
FIG. 3 is a fragmentary exploded view showing an assembly of a blower and a sawdust collector of the wood planing machine of FIG. 1.

FIGS. 1 to 5 illustrate a wood planing machine embodying this invention. The wood planing machine includes: a base 31 having two opposite sides and front and rear sides; two pairs of supporting rods 33 respectively extending upright from the opposite sides of the base 31; a cutter carriage 30 including a pair of parallel rectangular carriage casings 32 extending between and mounted movably and respectively on the pairs of the supporting rods 33; a motor housing 34 mounted on the cutter carriage 30 between the carriage casings 32 at the rear side of the base 31, and having a vent port 342 that opens frontwardly; a motor (not shown) disposed in the motor housing 34 and having a first shaft 343 extending therefrom in a transverse direction toward one of the carriage casings 32; a rotary cutter 35 mounted rotatably on and extending in the transverse direction between the carriage casings 32 below the motor housing 34 and adapted to plane a wooden workpiece 90 thereunder; a rotatable second shaft 351 projecting from one end of the rotary cutter 35 in the transverse direction through said one of the carriage casings 32 and connected to the first shaft 343 via a pulley-and-belt mechanism 341 so as to be driven by the motor; a blower 50 mounted on said one of the carriage casings 32 opposite to the second shaft 351, and having a blower housing 53 with an inlet port 532 and an outlet port 533, and a fan 52 disposed in the blower housing 53 and connected to the second shaft 351; a sawdust-guiding member 40 that includes an elongated box 41 mounted on the cutter carriage 30 via a lug plate 415 secured to the carriage casings 32 at the front side of the base 31 and extending between the carriage casings 32 in the transverse direction to define therein a flow channel 412 with an entrance port 414 and an exit port 413 opposite to the entrance port 414, and a rear spout 411 extending rearwardly in a direction transverse to the flow channel 412 to the rotary cutter 35 to define a sawdust passageway 416 therein, the spout 411 having an arcuate open end 417 that circumferentially surrounds a top portion of the rotary cutter 35 to define therebetween a sawdust entrance space 418 that is in fluid communication with the sawdust passageway 416; an air duct 42 having two opposite open ends 421, 422 respectively interconnecting and in fluid communication with the vent port 342 of the motor housing 34 and the entrance port 414 of the box 41; a first conduit 60 interconnecting and in fluid communication with the inlet port 532 of the blower housing 53 and the exit port 413 of the box 41; a second conduit 70 connected to and in fluid communication with the outlet port 533 of the blower housing 53; and a sawdust collector 80 connected to and in fluid communication with the second conduit 70.

Figure 4:
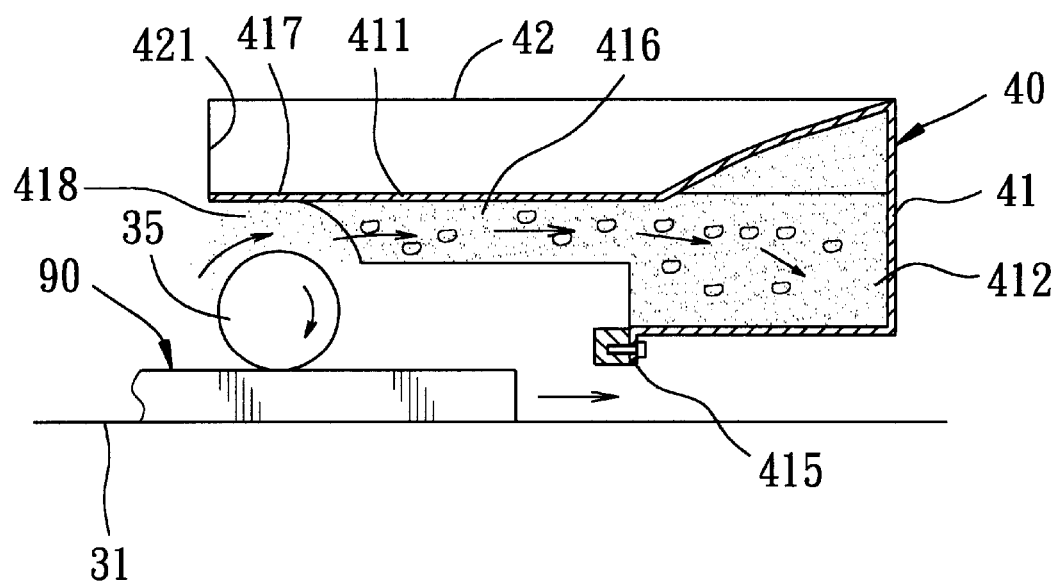
FIG. 4 is a partly cross-sectional side view of the sawdust-guiding member of the wood planing machine of FIG. 1, which illustrates a sawdust passageway.
Figure 5:
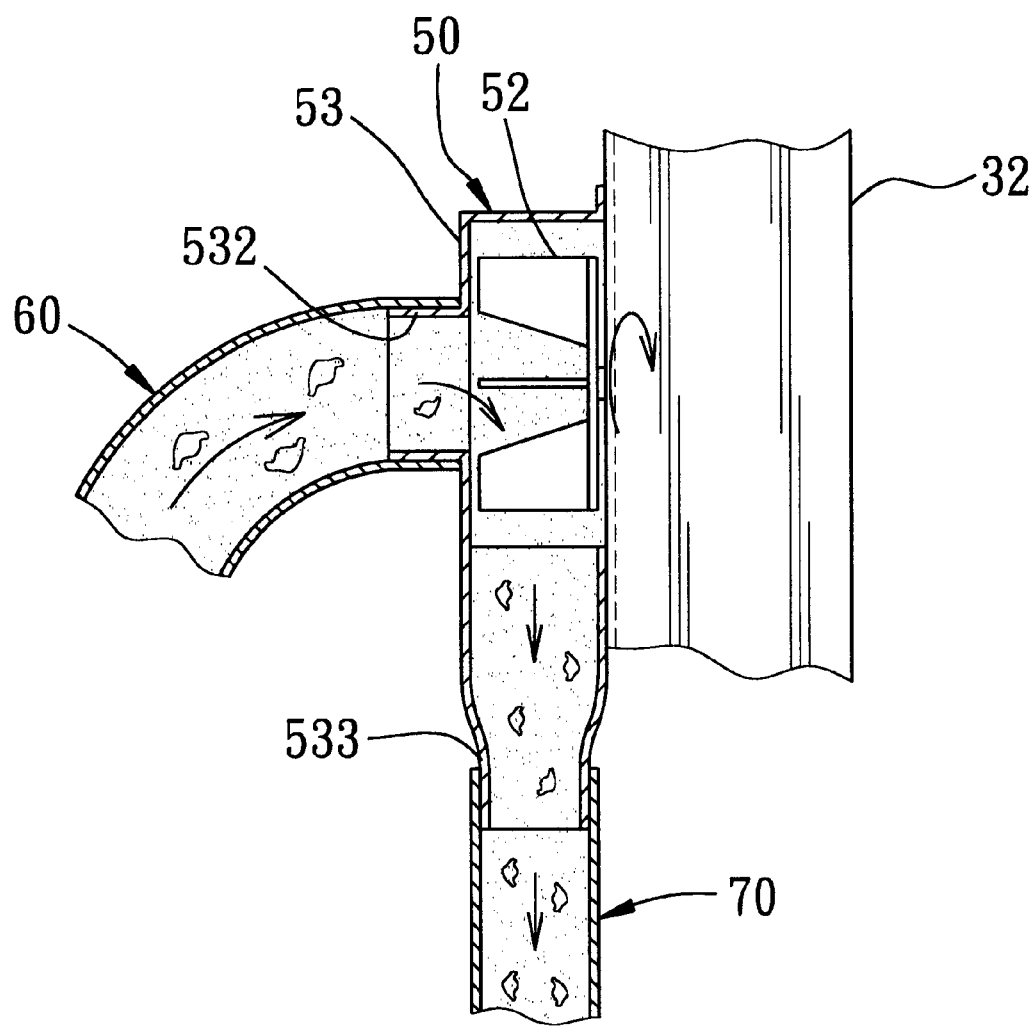
FIG. 5 is a partly cross-sectional top view of the blower of the wood planing machine of FIG. 1, which illustrates flow of the sawdust.

As illustrated in FIGS. 4 and 5, rotation of the motor results in air flow from the vent port 342 into the flow channel 412 via the air duct 42, and simultaneously causes rotation of the fan 52 via the second shaft 351, which, in turn, results in induction of air flow from the flow channel 412 to the sawdust collector 80 via the first and second conduits 60, 70.

By utilizing the air flow generated during rotation of the motor and by incorporating a blower 50, which is driven by the motor via the rotary cutter 35, to enhance the removal of the sawdust upon planing, the energy required to collect the sawdust can be significantly reduced. Moreover, with the sawdust-guiding member 40, which is directly and fittingly mounted on the cutter carriage 30, the effectiveness of removal of the sawdust can be enhanced, and the uneconomical drawback as encountered in the prior art can be eliminated as well.

With the invention thus explained, it is apparent that various modifications can be made without departing from the spirit of the present invention. It is therefore intended that the invention be limited only as recited in the appended claims.

I claim:

1. A wood planing machine comprising:

a base having two opposite sides and front and rear sides;

two pairs of supporting rods respectively extending upright from said opposite sides of said base;

a cutter carriage including a pair of parallel carriage casings extending between and mounted movably and respectively on said pairs of said supporting rods;

a motor housing mounted on said cutter carriage between said carriage casings at said rear side of said base, and having a vent port that opens frontwardly;

a motor disposed in said motor housing;

a rotary cutter mounted on and extending in a transverse direction between said carriage casings below said motor housing, and adapted to plane a wooden workpiece thereunder;

a rotatable shaft extending from said rotary cutter in said transverse direction through one of said carriage casings and driven by said motor;

a blower mounted on said one of said carriage casings opposite to said shaft, and having a blower housing with an inlet port and an outlet port, and a fan disposed in said blower housing and connected to said shaft;

a sawdust-guiding member that includes a box mounted on said cutter carriage at said front side of said base and extending in said transverse direction between said carriage casings to define therein a flow channel with an entrance port and an exit port opposite to said entrance port, and a rear spout extending rearwardly in a direction transverse to said flow channel to said rotary cutter to define a sawdust passageway therein, said spout having an arcuate open end that circumferentially surrounds a top portion of said rotary cutter to define therebetween a sawdust entrance space that is in fluid communication with said sawdust passageway;

an air duct interconnecting and in fluid communication with said vent port of said motor housing and said entrance port of said box;

a first conduit interconnecting and in fluid communication with said inlet port of said blower housing and said exit port of said box;

a second conduit connected to and in fluid communication with said outlet port of said blower housing; and a sawdust collector connected to and in fluid communication with said second conduit;

whereby, rotation of said motor results in air flow from said vent port into said flow channel via said air duct, and simultaneously causes rotation of said fan via said shaft, which in turn, results in induction of air flow from said flow channel to said sawdust collector via said first and second conduits.

* * * * *